United States Patent Office 3,016,369
Patented Jan. 9, 1962

3,016,369
ORGANOTIN ACRYLIC POLYMERS
Juan C. Montermoso, Cochituate, Loreto P. Marinelli, Norwood, and Troy M. Andrews, Sudbury, Mass., assignors to the United States of America as represented by the Secretary of the Army
No Drawing. Filed July 16, 1958, Ser. No. 749,038
14 Claims. (Cl. 260—80)
(Granted under Title 35, U.S. Code (1952), sec. 266)

The invention described herein, if patented, may be manufactured and used by or for the Government for governmental purposes, without the payment to us of any royalty thereon.

This invention relates to the preparation of organotin derivatives of acrylic type acids having utility as elastomers, plastics, and the like, particularly as rubber type materials.

In accordance with this invention, the group of organotin derivatives of acrylic acids may be generally designated as condensation products of monofunctional organotin compounds and acrylic type acids with subsequent vinyl type polymerization to elastomeric or plastic type products. The general formula for the organotin acrylic polymers produced in accordance with our invention is postulated to be

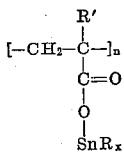

wherein R is a monovalent hydrocarbon radical, R' is hydrogen or a monovalent hydrocarbon radical and $x$ is from 2 to 3. When $x$ is 3, i.e., when the tin atom of the repeating units carries three organic substituents, the polymer is a chain type polymer having elastomeric properties and a postulated general formula

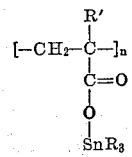

wherein R and R' have the same meaning as above. On the other hand when $x$ in the first-mentioned general formula is 2, i.e., when the tin atom in the repeating units carries only two organic substituents, the resulting polymer is generally a non-elastomeric plastic; this is believed to be due to cross-linking, occurring at the unsatisfied valence of the diorgano-substituted tin atom. When $x$ has a value greater than 2 but less than 3, i.e., when the average number of organic substituents carried by the tin atoms in the repeating units are intermediate the values 2 and 3, the properties of the resulting polymer will be either elastomeric or non-elastomeric, depending on the amount of cross-linking; such polymers can be produced by polymerizing a mixture of monomeric diorgano- and triorganotin esters of an acrylic acid, prepared in accordance with our invention.

We have not yet finally determined the molecular weights of the elastomeric and plastic polymers produced in accordance with our invention, however, in one instance we have found the molecular weight to be about 162,000 which corresponds to a presence of several hundred repeating units in the polymer.

Reverting now to the postulated general formula

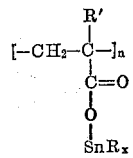

of a repeating unit, it is apparent that R and R' may be any monovalent hydrocarbon radical, either aliphatic (including cycloaliphatic, such as cyclohexyl) or aromatic (phenyl, tolyl, benzyl or other aryl, alkaryl, aralkyl). When R or R' is aliphatic, it may be an alkyl radical such as methyl, ethyl, propyl, butyl, lauryl. When the ester-forming acid is acrylic acid ($CH_2$:CH.COOH), R' is of course hydrogen. Suitable acrylic type acids are thus, e.g., acrylic acid, methacrylic acid, vinyl acetic acid, allylacetic acid, or phenylacrylic acid. Of these, methacrylic acid and tributyl tin oxide of the aforesaid reactants are presently preferred for the formation of organotin monomers and their subsequent elastomeric polymers. Other suitable alkyl or aryl type compounds may be employed for the esterification and subsequent formation of polymeric materials.

The triorganotin derivatives of this invention are polymeric and elastomeric materials suitable for use where polymeric or elastomeric products are generally used such as film, foil, coatings, impregnation, and elastomeric or polymeric materials in general.

These compounds may be prepared in high yield and purity by reacting triorganotin oxide with an unsaturated carboxylic acid having at least one free carboxyl group and recovering a product having the aforesaid general formula. More specifically, a triorganotin oxide may be condensed with a carboxylic acid having at least one free carboxyl group and at least one unsaturated group to produce an organotin acrylate ester intermediate product capable of further polymerization. As a further step in the preparation of an elastomeric or polymeric material, the initially obtained product is subsequently treated with a polymerizing agent, whereby the unsaturated carbon bonds of the material are converted to much larger polymeric units, postulated to be generally chain polymer elastomeric material.

The reaction for the aforesaid organotin derivatives is illustrated in the following equations:

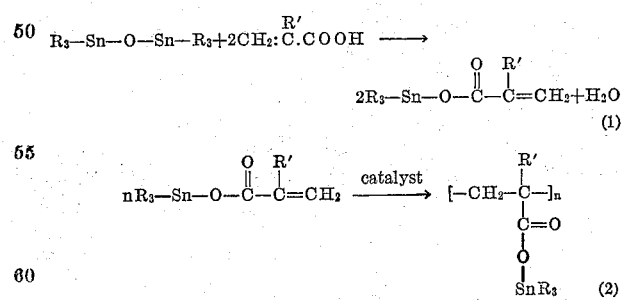

These equations show that the initial reaction is between the organotin oxide and the carboxyl group of the acrylic acid material, whereby water is split off in the reaction and a chemical bond is formed, thus producing an ester of the organo-tin. Equation 1 illustrates the formation of the monomer by reacting two mols of the monofunctional acid with one mol of the organotin oxide. Equation 2 shows the formation of a chain type polymeric elastomeric or rubbery material, whereby the organotin acrylic monomer is converted to a high polymer material by means of oxidizing or other suitable polymerization catalysts. This reaction takes place through the unsaturated carbons of the organotin acrylic monomer with the formation of what is believed to be a long chain polymer that gives elastomeric or rubbery properties to the resulting product. Any suitable type catalyst such as benzoyl peroxide or dicumyl peroxide for bulk polymerization and potassium persulfate-lauryl mercaptan in emulsification polymerization, or combinations of these, may be used as the polymerizing agent to convert the aforesaid monomers or mixed monomer-polymer material to the long chain type elastomeric or rubbery products of this invention. Any suitable reaction temperatures may be employed. However, if preferred a low temperature of 30° to 50° C. may be used for the esterification in order to secure a very high content of organotin ester monomer. The water of reaction may be readily removed by using vacuum during the reaction at low temperature. A higher temperature such as the boiling point of benzene, xylene, alcohol etc. may be employed. This, however, gives a lower content of monomer, since the ester polymerizes considerably at temperatures above 50° C. The resulting mixed monomer and polymer does not crystallize readily on cooling due to the considerable polymerization at high temperature. On the other hand, when using a 50° C. or lower reaction temperature, the organotin ester crystallizes in near theoretical yield on cooling the benzene or xylene solution.

The crystalline monomer may be filtered off and used or further recrystallized to a very pure monomer product suitable for subsequent polymerization or copolymerization with similar or different organotin ester products having unsaturated carbon bonds. The usual oxidizing bulk and emulsion catalysts may be employed, e.g., benzoyl peroxide, dicumyl peroxide, persulfate, mercaptan, etc.

The use of one or more inert organic solvents as the medium for the reaction, such as benzene, toluene etc. with or without vacuum during the esterification process is another feature of this invention. The presence of such solvents facilitates the desired reaction and the removal of water during reaction, whether carried out under vacuum or at normal pressure. The solvent may be eliminated at the end of the reaction by suitable means, including vaporization under vacuum, cooling the original solution and filtering off the resultant crystals, vaporization at elevated temperature, or other suitable means. The organotin derivatives of acrylic acid type materials are obtained in near theoretical yields. This indicates that all of both reactants are substantially completely utilized in the formation of the final reaction product which may exist as a monomer or polymer or their admixture.

We now proceed to illustrate the practice of our invention by means of several examples without, however, limiting ourselves to any specific details or conditions set forth therein.

*Example I*

103.8 g. (.175 mol) tributyl tin oxide and 300 ml. of benzene are placed in a round bottom flask with reflux condenser and stirrer. To this is added slowly 30 g. (.35 mol) of methacrylic acid, providing an approximately 1:1 molecular equivalent ratio, based on the tin, of the reacting components. Otherwise put, since tributyltin oxide, $(C_4H_9)_3Sn.O.Sn(C_4H_9)_3$, has two tin atoms per molecule, two mols of methacrylic acid $CH_2:C(CH_3).COOH$ are needed for the esterification reaction according to the equation:

$(C_4H_9)_3Sn.O.Sn(C_4H_9)_3 + 2CH_2:C(CH_3).COOH \longrightarrow$

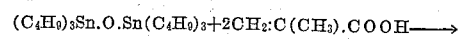
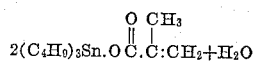

The temperature rises during the addition of the methacrylic acid and cooling is used as is needed. There results a cloudy solution. The mixture is then heated just to boiling point and gently refluxed until the cloudiness disappears and a clear, pale yellow solution results. Heating is then continued at reflux for one hour. The benzene solvent and water of reaction is then evaporated from the product on a hot water bath. The residual product is a slightly yellow syrupy mass which solidifies at −10° C. The viscous product was placed in a beaker and then dissolved in 80 ml. of warm benzene. To the solution is then added with stirring 1% by weight of benzoyl peroxide based on the tin-acrylate product in small portions over a period of one-half hour. The solution is then allowed to stand 15 to 20 minutes to initiate the reaction at controllable temperature. The solution is then heated with watch glass cover to a gentle boil on a hot water bath for 3 hours. The cover is then removed from the beaker and most of the benzene allowed to evaporate. The residual benzene is removed by evaporation in a vacuum oven at 110° C. for 1½ hours. This final heating also acts to further the polymerization of the tin methacrylate product. The product is a very viscous, pale yellow elastomeric product at the end of the aforesaid heating period. When cooled, the product is a tough solid material having high elastomeric rubbery properties. The yield is 98% of the theoretical based on the tributyltin and methacrylic acid employed for the reaction. The end product, polymeric tributyltin methacrylate,

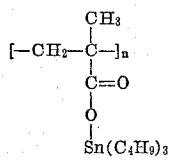

softens at elevated temperatures while retaining its elastomeric properties. The molecular weight of the polymer is estimated at about 162,000.

*Example II*

Example I is repeated, using, however, 1% by weight of dicumyl peroxide catalyst instead of benzoyl peroxide. The resulting elastomeric polymer was slightly harder than the one obtained in Example I.

*Example III*

103.8 g. of tributyl tin oxide and 300 cc. of benzene are placed in a round bottom flask with reflux condenser. To this is added 30 g. of methacrylic acid at a slow rate so as not to have a rapid temperature rise from the heat of reaction. This provides a 1:1 equivalent ratio, based on the tin, of the two reactants. Cooling is used as necessary. The solution is then heated at 50° C. until the cloudiness disappears and for 30 additional minutes. There results a clear, pale yellow solution. Heating is continued for one hour at 50° C. The total time of reaction is four to five hours. The benzene is then evaporated under vacuum at 50° C. until all the benzene has been removed. The resulting pale yellow viscous syrup solidifies at 15–17° C. to a hard crystalline mass. To the product are then added 80 g. of benzene, and the whole is warmed gently with stirring to solution. To the warm solution is added 1% by weight of dicumyl peroxide in small portions with stirring. The solution is allowed to stand 20 minutes. Then the solution is warmed to a gentle boil. The beaker is covered with a watch glass to prevent the loss of more than a small part of the benzene and the solution is held at gentle boil for 3 hours. The benzene is then evaporated on a water bath to give a very viscous residual mass. Any residual benzene is removed by evaporation in a vacuum air oven at 110° C. for 1½ hours. The product is a very viscous pale yellow elastomeric polymer while still hot. All the crystalline material has disappeared and the product will no longer harden to the very hard crystalline type as it did in the monomeric stage before its polymerization. When cooled the product is a very tough, highly elastic rubbery material.

Example IV

Example III is repeated, using, however, 1% by weight of dicumyl peroxide catalyst instead of benzoyl peroxide. The resulting elastomer is substantially identical with that obtained in Example III.

Example V 103.8 g. of tributyl tin oxide and 300 cc. of benzene are placed in a 1000 ml. round flask. The benzene in the flask is then cooled to 15° C. To this is then added slowly with stirring 30 g. of methylacrylic acid. The flask is cooled with an external cold bath so that the temperature does not rise above 25° C. during the methacrylic acid addition. After completion of the addition, gradual heating is applied and at the same time vacuum is used to slowly pull off the benzene. The benzene loss is replaced by the addition of benzene through a dropping funnel. The temperature is not allowed to go beyond 30° C. The water of reaction is thus removed as the reaction proceeds and the solution becomes clear. The solution is then heated one hour additional at 30° C. and the benzene then evacuated as completely as possible. The pale yellow liquid was diluted with 100 ml. of petroleum ether and allowed to crystallize at −20° C. to large, clear, thick, long crystals. The mother liquor is drained off and the crystals dissolved in petroleum ether and cooled as before. The mother liquor was added to the original liquor, the solvent partially evaporated, and the solution again cooled to form more crystals. After the mother liquor was poured off, these crystals were added to the first crystals. The crystals were allowed to melt and were then transferred to a desiccator and residual petroleum ether removed under vacuum. The product is a clear, slightly pale yellow liquid having a freezing point of 18° C. To the liquid is then added 1.5% by weight of dicumyl peroxide dissolved in 50 ml. benzene. The solution is then heated just below the boiling point of benzene for 2 hours. The temperature is then raised to 140° C. as the benzene evaporates and held there for 2 hours. The tacky mass is then treated a second time with 1.5% dicumyl peroxide and finished as in the first treatment. The product is then evacuated for two days in a desiccator, then in a vacuum air oven for 3 hours at 110° C. The resulting product is a very stiff elastomeric material.

Example VI

The procedure of Example V is repeated through the first desiccation step, i.e., until a clear, slightly pale yellow liquid having a freezing point at 18° C. is obtained. This monomeric material is subjected to emulsion polymerization according to the following approximate proportions:

| | Grams |
|---|---|
| Monomer | 100.0 |
| Water | 180.0 |
| Tergitol NPX | 5.0 |
| Lauryl mercaptan | 0.5 |
| Potassium persulfate | 0.3 |

Other commercially available emulsifiers (e.g., Triton X-100, a polyethylene glycol alkyl aryl ether) may, of course, be used in lieu of Tergitol NPX. The Tergitol NPX (a commercially available emulsifying agent—alkyl phenyl ether of polyethylene glycol) is first dissolved with rapid stirring in hot water in a 1000 cc. flask and cooled to 50° C. The lauryl mercaptan and potassium persulfate are then added. While stirring rapidly at 50° C., the monomer is added slowly over a 15 minute period and the reaction of polymerization alowed to proceed at 50° C. and rapid stirring for 9 hours. The resulting polymer in the latex form is coagulated by the addition of methyl alcohol or aqueous sodium chloride solution. The residual polymeric material is well washed with distilled water to remove any residual emulsification material, catalyst, and salt. The polymer is then placed in a vacuum air oven at 50° C. for 48 hours to remove water. The resulting slightly yellow product is a stiff elastomeric material.

The foregoing examples illustrate the practice of our invention with the use of tributyl tin oxide and methacrylic acid as the original reactants. The following two examples are illustrative of the practice of our invention with other reactants.

Example VII 100 g. tributyl tin oxide and 100 ml. of benzene are placed in a 500 ml. flask with reflux condenser and stirrer. To this is slowly added 24.6 g. of acrylic acid with stirring. There is a temperature rise immediately following the addition. The solution is heated to 50° C. for one hour and then at benzene reflux for 3½ hours. White crystals form on cooling the benzene solution. The mass is transferred to a beaker and the benzene evaporated on an oil bath at a final temperature of 112° C. The mass is then dissolved in and recrystallized from petroleum ether. After three recrystallizations, a pure crystalline monomeric product melting at 74.5°–75.0° C. is obtained. This material is then subjected to polymerization as follows: The product is dissolved in 50 ml. benzene and there is added 1% benzoyl peroxide, based on the product. The mixture is refluxed for 2 hours, 3% benzoyl peroxide added, heated for 14 hours at a gradual temperature increase to 125–130° C., with simultaneous evaporation of the benzene and the remaining product is then placed in an oil bath at a temperature up to about 130° C. The resulting polymerization product is a very viscous light colored oil.

Example VIII

A pure crystalline monomeric product having a melting point of 74.5–75.0° C. is prepared by reacting 100 g. of tributyl tin oxide and 24.6 g. of acrylic acid in accordance with Example VII. The monomeric material is subjected to polymerization as follows. To the product dissolved in benzene is added 1% by weight of benzoyl peroxide with stirring. The benzene is evaporated and heating continued to 140° C. The temperature was held at 140° C. for one hour. The product is a very viscous material. At this time there was added 2½% dicumyl peroxide and heating continued—18 hours at 140° C. On cooling a slightly soft, flexible product is obtained. It is slightly yellow, clear, and is elastomeric.

Example IX

Example I is repeated, but a stoichiometrically equivalent amount of trimethyl tin oxide is substituted for the tributyl tin oxide of Example I. A tough solid elastomer results. Caution: Trimethyl tin oxide is poisonous and must be handled with appropriate precautions. The polymeric end product is harmless.

Example X

Example I is repeated, but a stoichiometrically equivalent amount (.175 mol) of triphenyl tin oxide is substituted for the tributyl tin oxide of Example I. An elastomeric rubbery material results.

Example XI

Example X is repeated, but a stoichiometrically equivalent amount (based on the tin constituent) of diphenyl tin oxide (.35 mol) is substituted in lieu of triphenyl tin oxide. A non-elastomeric plastic material, suitable for use, e.g., as a molding powder, is obtained upon polymerization.

Example XII

Example I is repeated, but a stoichiometrically equivalent amount (based on the tin constituent) of dibutyl tin oxide (.35 mol) is substituted in lieu of tributyl tin oxide.

A non-elastomeric plastic mass is obtained upon polymerization.

While the invention has been described with reference to various examples, procedures, and products, it will be apparent to those skilled in the art that various modifications may be made, equivalents substituted therefor, or other procedural methods employed to attain the objectives, without departing from the principles and true nature of the present invention.

We thus desire to claim our invention broadly, and to this end append hereto the following claims, which should be interpreted as broadly as the prior art and the spirit of our invention, as generally described in the foregoing specification, permit.

What is claimed is:

1. An elastomeric organic-solvent-soluble heat-softenable organotin acrylic homopolymer consisting of repeating units having the general formula

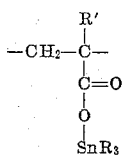

wherein R is a monovalent saturated hydrocarbon radical having at least four carbon atoms, and R' is a member selected from the group consisting of hydrogen and a monovalent saturated hydrocarbon radical.

2. An organotin acrylic homopolymer according to claim 1, wherein R is aliphatic.

3. An organotin acrylic homopolymer according to claim 1, wherein R is alkyl.

4. An organotin acrylic homopolymer according to claim 1, wherein R is butyl.

5. An organotin acrylic homopolymer according to claim 1, wherein R' is hydrogen.

6. An organotin acrylic homopolymer according to claim 5, wherein R is alkyl.

7. An organotin acrylic homopolymer according to claim 1, wherein R' is alkyl.

8. An organotin acrylic homopolymer according to claim 1, wherein R and R' are alkyl.

9. An organotin acrylic homopolymer according to claim 1, wherein R' is methyl.

10. An elastomeric organic solvent-soluble heat-softenable organatin acrylic homopolymer consisting of repeating units having the general formula

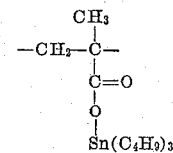

11. An organotin acrylic homopolymer according to claim 1, wherein R' is aromatic.

12. Process of preparing an elastomeric organic-solvent-soluble heat-softenable organotin acrylic homopolymer, comprising homopolymerizing an organotin acrylate having the general formula

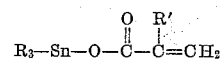

wherein R is a monovalent saturated hydrocarbon radical having at least four carbon atoms, and R' is a member selected from the group consisting of hydrogen and a monovalent saturated hydrocarbon radical, in contact with at least one polymerization catalyst, said catalyst being a member selected from the group consisting of peroxide, persulfate and mercaptan.

13. Process of preparing an elastomeric organic-solvent-soluble heat-softenable organotin acrylic homopolymer, comprising homopolymerizing tributyltin acrylate in contact with at least one polymerization catalyst, said catalyst being a member selected from the group consisting of peroxide, persulfate and mercaptan.

14. Process of preparing an elastomeric organic-solvent-soluble heat-softenable organotin acrylic homopolymer, comprising homopolymerizing tributyltin methacrylate in contact with at least one polymerization catalyst, said catalyst being a member selected from the group consisting of peroxide, persulfate and mercaptan.

References Cited in the file of this patent

UNITED STATES PATENTS

| 2,253,128 | Langkammerer | Aug. 19, 1941 |
| 2,770,611 | Nitzsche et al. | Nov. 13, 1956 |

OTHER REFERENCES

Van Der Kerk et al.: Journal of Applied Chemistry (London), vol. 7, pages 356–365 (1957).

Coates: Organo-Metallic Compounds, (1956), pg. 126, Publ. by J. Wiley & Sons, Inc., N.Y.